US006757448B2

(12) United States Patent
Sasaki

(10) Patent No.: US 6,757,448 B2
(45) Date of Patent: Jun. 29, 2004

(54) IMAGE PROCESSING METHOD, IMAGE PROCESSING APPARATUS, AND COMPUTER PROGRAM

(75) Inventor: Nobuo Sasaki, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 327 days.

(21) Appl. No.: 09/933,611

(22) Filed: Aug. 21, 2001

(65) Prior Publication Data

US 2002/0050998 A1 May 2, 2002

(30) Foreign Application Priority Data

Aug. 21, 2000 (JP) ........................................ 2000-249667
Aug. 15, 2001 (JP) ........................................ 2001-246783

(51) Int. Cl.[7] ................................................ G06K 9/32
(52) U.S. Cl. ...................... 382/295; 345/643; 345/672; 345/682; 345/474; 345/678
(58) Field of Search .......................... 382/295; 345/643, 345/672, 682, 474, 678

(56) References Cited

U.S. PATENT DOCUMENTS 4,267,573 A * 5/1981 Chaikin et al. ............. 382/296
5,949,434 A * 9/1999 Charlton ..................... 345/682
2003/0107577 A1 * 6/2003 Obara et al. ................ 345/506

* cited by examiner

Primary Examiner—Mark Zimmerman
Assistant Examiner—Adam Arnold
(74) Attorney, Agent, or Firm—Lerner, David, Littenberg, Krumholz & Mentlik, LLP

(57) ABSTRACT

There is provided an apparatus including a plurality of processors 20, which generates a plurality of candidate status variable values as a candidate of status variable value at which the status of object image is fixed and which selects a status variable value having the highest consistency with the condition from among them, and an influence controller 10 obtains the status variable value from each processor to broadcast the obtained status variable value to all processors at the same time. Since each processor selects a status variable value having the highest consistency with the condition from among the plurality of candidates, an appropriate image can be obtained. Moreover, the processor can generate the status variable value at the next point in consideration of the status variable values of all processors sent from the influence controller so as to obtain an image in which a plurality of objects is influenced each other.

19 Claims, 9 Drawing Sheets

IMAGE PROCESSING METHOD, IMAGE PROCESSING APPARATUS, AND COMPUTER PROGRAM

CROSS-REFERENCE TO RELATED APPLICATIONS

This application is based upon and claims the benefit of priority from the prior Japanese Patent Applications Nos. 2000-249667, filed Aug. 21, 2000 and 2001-246783, filed Aug. 15, 2001, the entire contents of both of which are incorporated herein by reference.

BACKGROUND OF THE INVENTION

1. Field of the Invention

The present invention relates to a technique for processing object data to express the status of an object image by computer graphics (CG), and more particularly to an image processing method and an image processing apparatus, which are suitable for expressing the object image in the way of chaos-like motion. The "object" is hereinafter referred to as an object that is to be expressed. In this specification, the "object" includes animate beings that move irregularly and the like.

2. Description of the Related Art

In connection with how an object image, which is expressed by CG, moves, the motion is determined in accordance with a program that CG designers have decided at the producing stage. This kind of program determines the motion of object image by using the known motion capture and performing numeral calculation using physical law.

Since the object normally moves based on a given logic, the motion can be predicted to a certain degree. This makes it possible to easily determine the motion by the aforementioned program and the expressed motion of the object image becomes natural.

However, in some cases, the object image having unnatural motion is formed, depending on the design of the program in expressing an object image that performs unpredictable motion. Particularly, in the case of expressing biological motion in such a way that a plurality of objects moves to be suited to accomplishing an end as being associated with each other at high speed, it is extremely difficult to design the program for implementing such an expression. Even if such a program is produced, a large amount of data processing and processing time are required in image processing, which is performed by such a program. For this reason, it is unsuitable for expressing the above-mentioned biological motion in the video game and the like that need real time processing in a normal case.

However, in order to raise a user's interest, the expression of the object image that performs more natural and free motion, which is not supported by the logic and which is unpredictable by the user, is required in the recent video game and the like.

In order to make it possible to obtain such an expression, the method using fluctuation variables such as random numbers is conventionally known in the field of image processing. Namely, status variable values, which indicate the status of the position of object, the shape and the like, are obtained using the fluctuation variables, whereby expressing the chaos-like behavior. Whether or not this behavior is naturally seen is determined by checking whether or not the status variable values obtained using the fluctuation variables are within a predetermined range. When the status variable values are within the predetermined range, the status variable values are used. When the status variable value is out of the predetermined range, the status variable value is not used since the unnatural behavior is performed, and status variable values are obtained again using the fluctuation variables.

As mentioned above, in the case of expressing motion in such a way that a plurality of objects moves to be suited to accomplishing an end as being associated with each other, the amount of data processing increases. For this reason, there may be used a multi-processor system that performs data processing using a plurality of processors.

In the case of using the multi-processor, the transmission and reception of the status variable values between the processors physically connected can be easily performed. However, as the need for transmitting and receiving the status variable values among all processors mutually comes about, it takes much time to perform the transmission and reception of the status variable values and this makes it impossible to perform high-speed processing.

For example, in the case of obtaining the status variable values of one object using one processor, direct transmission and reception of the status variable values between the processors directly connected can be mutually and smoothly performed to make it easy to provide the interrelationship between the objects. However, direct transmission and reception of the status variable values cannot be performed between the processors, which are not directly connected to each other. In this case, since the status variable values must be transmitted and received via the other processor connected to the processor that will perform transmission and reception, high-speed processing cannot be carried out.

Though all processors are connected to one another in a crossbar manner to make it possible to transmit and receive the status variable value using the entire multi-processor at high speed, this case needs the massive amounts of hardware and is not the realistic way.

SUMMARY OF THE INVENTION

An object of the present invention is to provide an image processing method and an apparatus for allowing motion of an object image to be expressed more naturally.

Another object of the present invention is to provide an image processing method and an apparatus that can express motion in such a way that a plurality of objects moves to be suited to accomplishing an end as being associated with each other at high speed.

Still another object of the present invention is to provide a computer program for implementing the aforementioned image processing apparatus in a computer system.

According to the present invention, there is provided an image processing method, in an apparatus for generating object data for expressing the status of an object image, the image processing method comprising the steps of generating a predetermined number of candidate status variable values as a candidate of a status variable value that fixes a status of the object image at a certain point; determining a first candidate status variable value having the highest consistency with a predetermined condition value as the status variable value; and generating the object data at the corresponding point based on the determined status variable value.

The status variable value is determined based on the optimal first candidate status variable value every point to generate object data based on the determined status variable value. For this reason, the motion of object image is defined as the condition value to make it possible to easily express the object image with free motion.

The predetermined number of candidate status variable values is generated in time sequence using a fluctuation variable changeable within a given range.

There is provided another image processing method, which is executed by an apparatus, having a controller that performs two-way communication between a plurality of processors and each processor, for generating object data to express the status of an object image allocated to each of the processors using each of the processors, the method comprising the steps of: generating candidate status variable values as a candidates of a status variable value that fixes a status of the object image at a certain point to transmit the candidate status variable value to the controller individually by at least one of the plurality of processors; broadcasting reference numeral values including the candidate status variable values to all processors at the same time by the controller that has received the candidate status variable value; and quantifying a relative relationship between the reference numeral values received from the controller and the corresponding candidate status variable value to generate the object data at the corresponding point based on the candidate status variable value when the quantifying result is within a predetermined range unique to the corresponding processor by the processor that has transmitted the candidate status variable value.

The "reference numeral value" is that one or a plurality of candidate status variable values sent from the processor is transferred to all processors from the controller so that the transferred candidate status variable values are used as a reference when each processor determines the relative relationship. When only one candidate status variable value is sent from a certain processor, the candidate status variable value normally becomes the same value. When the number of candidate status variable values is two or more, the average value can be used as a reference numeral value.

The use of reference numeral value allows the candidate status variable values generated by each processor to be easily sent to the other all processors. Namely, when the processing result is sent to the processor other than the processors direct connected, a massive amount of time is needed to send the processing result to all the plurality of processors since the processing result must be sent via the directly connected processors. However, according to the present invention, the processing results of all processors are fetched by the controller to allow the results, serving as reference numeral values, to be transmitted to the respective processors at the same time. This makes it possible to send the processing results to all processors for a short time as compared with the conventional case.

Moreover, it is possible to easily receive the candidate status variable values generated by the other processors. Hence, the candidate status variable value generated by each processor is compared with each of the candidate status variable values generated by the other processors to make it possible to easily confirm the validity of the candidate status variable value generated by each processor. Accordingly, for example, motion in which the plurality of objects moves to be suited to accomplishing an end as being associated with the plurality of objects images can be expressed at high speed.

There is provided another image processing method, which is executed by an apparatus, having a controller that performs two-way communication between a plurality of processors and each processor, for generating object data to express the status of an object image allocated to each of the processors using each of the processors, the method comprising the steps of: generating a predetermined number of candidate status variable values as a candidate of a status variable value that fixes a status of the object image to transmit a first candidate status variable value having the highest consistency with a predetermined condition value to the controller individually by at least one of the plurality of processors; broadcasting reference numeral values including the first candidate status variable value to all processors at the same time by the controller that has received the first candidate status variable value; and quantifying a relative relationship between the reference numeral values received from the controller and the first candidate status variable value to generate the object data based on the first candidate status variable value when the quantifying result is within a predetermined range unique to the corresponding processor by the processor that has transmitted the first candidate status variable value.

The status variable value is determined based on the optimal candidate status variable value (first candidate status variable value) so as to generate object data based on the determined status variable value. For this reason, the motion of object image is defined as the condition value to make it possible to easily express the object image with free motion.

Moreover, according to this method, the first candidate status variable value can be transmitted to all processors from the controller for a short time, motion in which the plurality of objects moves to be suited to accomplishing an end as being associated with the plurality of objects images can be expressed at high speed.

At least of the plurality of processors generates a fluctuation variable changeable within a given range to produce the candidate status variable value based on the fluctuation variable, whereby generating the object data to express the object image in a chaos manner.

The reference numeral values may include the above-mentioned fluctuation variables in addition to the candidate status variable values. Namely, the processor that has generated the fluctuation variable transmits the fluctuation variable to the controller individually, the controller that has received the fluctuation variable obtains an average value of all fluctuation variables received so as to broadcast the average value to all processors that have transmitted the fluctuation variable, and the processor that has received the average value generates the candidate status variable value based on the average value and the generated fluctuation variable.

This makes it possible to reflect the influence of fluctuation variable value generated by the other processor on the fluctuation variable value for generating the candidate status variable value. Accordingly, for example, even if the individual objects look as if they moved independently, an image that moves like one group as a whole.

In these apparatuses for generating object data, the plurality of processors is divided into one or more groups, one of the candidate status variable values determined by the respective processors in one group is used as a common status variable value employed in all processors belonging to the corresponding group. It is possible to express the object image with free motion easily similar to the case in which the plurality of candidate status variable values are generated by one processor and the status variable value having the highest consistency with the condition value is selected from among them and the resultant is used as the first candidate status variable value. However, this makes it possible to perform high-speed processing as compared with the processing performed by one processor since the candidate status variable values are generated by the processors belonging to the group.

According to the present invention, there is provided an image processing apparatus, which generates object data to express the status of an object image, the apparatus comprising: a generator for generating a predetermined number of candidate status variable values as a candidate of a status variable value that fixes a status of the object image at a certain point in time sequence using a fluctuation variable changeable within a given range; and a generator for determining a first candidate status variable value having the highest consistency with a predetermined condition value as the status variable value among the predetermined number of generated candidate status variable values in time sequence every point so as to generate the object data at the corresponding point based on the status variable value determined at each point, whereby the object image is expressed in a chaos manner.

According to the present invention, there is provided an image processing apparatus, which has a controller that performs two-way communication between a plurality of processors and each processor, for generating object data to express the status of an object image allocated to each of the processors using each of the processors, at least one of the plurality of processors comprising: a generator for generating candidate status variable values as a candidate of a status variable value that fixes a status of the object image at a certain point; a transmitter and receiver for transmitting the generated candidate status variable values to the controller individually and for receiving reference numeral values, including the candidate status variable values transmitted from the processor, from the controller; and generator for quantifying a relative relationship between the received reference numeral values received and the generated candidate status variable value so as to generate the object data at the corresponding point based on the candidate status variable value when the quantifying result is within a predetermined range unique to the corresponding processor.

According to the present invention, there is provided an image processing apparatus, which has a controller that performs two-way communication between a plurality of processors and each processor, for generating object data to express the status of an object image allocated to each of the processors using each of the processors, at least one of the plurality of processors comprising: a specifier for generating a predetermined number of candidate status variable values as a candidate of a status variable value that fixes a status of the object image at a certain point so as to specify a first candidate status variable value having the highest consistency with a predetermined condition value; a transmitter and receiver for transmitting the specified first candidate status variable value to the controller individually and for receiving reference numeral values, including the first candidate status variable value transmitted from the processor, from the controller; and generator for quantifying a relative relationship between the received reference numeral values received and the specified candidate status variable value so as to generate the object data at the corresponding point based on the first candidate status variable value when the quantifying result is within a predetermined range unique to the corresponding processor.

According to the present invention, there is provided a computer program for operating a computer system as an image processing apparatus for generating object data to express the status of an object image, the image processing apparatus comprising: a generator for generating a predetermined number of candidate status variable values as a candidate of a status variable value that fixes a status of the object image at a certain point in time sequence using a fluctuation variable changeable within a given range; and a generator for determining a first candidate status variable value having the highest consistency with a predetermined condition value as the status variable value among the predetermined number of generated candidate status variable values in time sequence every point so as to generate the object data at the corresponding point based on the status variable value determined at each point, whereby the object image is expressed in a chaos manner.

According to the present invention, there is provided a computer program for operating a computer system as an image processing apparatus, the image processing having a controller that performs two-way communication between a plurality of processors and each processor, for generating object data to express the status of an object image allocated to each of the processors using each of the processors, at least one of the plurality of processors comprising a generator for generating candidate status variable values as a candidate of a status variable value that fixes a status of the object image at a certain point; a transmitter and receiver for transmitting the generated candidate status variable values to the controller individually and for receiving reference numeral values, including the candidate status variable values transmitted from the processor, from the controller; and a generator for quantifying a relative relationship between the received reference numeral values received and the generated candidate status variable value so as to generate the object data at the corresponding point based on the candidate status variable value when the quantifying result is within a predetermined range unique to the corresponding processor.

According to the present invention, there is provided a computer program for operating a computer system as an image processing apparatus, the image processing having a controller that performs two-way communication between a plurality of processors and each processor, for generating object data to express the status of an object image allocated to each of the processors using each of the processors, at least one of the plurality of processors comprising: a specifier for generating a predetermined number of candidate status variable values as a candidate of a status variable value that fixes a status of the object image at a certain point so as to specify a first candidate status variable value having the highest consistency with a predetermined condition value; a transmitter and receiver for transmitting the specified first candidate status variable value to the controller individually and for receiving reference numeral values, including the first candidate status variable value transmitted from the processor, from the controller; and a generator for quantifying a relative relationship between the received reference numeral values received and the specified candidate status variable value so as to generate the object data at the corresponding point based on the first candidate status variable value when the quantifying result is within a predetermined range unique to the corresponding processor.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Embodiments of the present invention will be specifically described with reference to the drawings accompanying herewith.

Entire Confirmation

Figure 1:
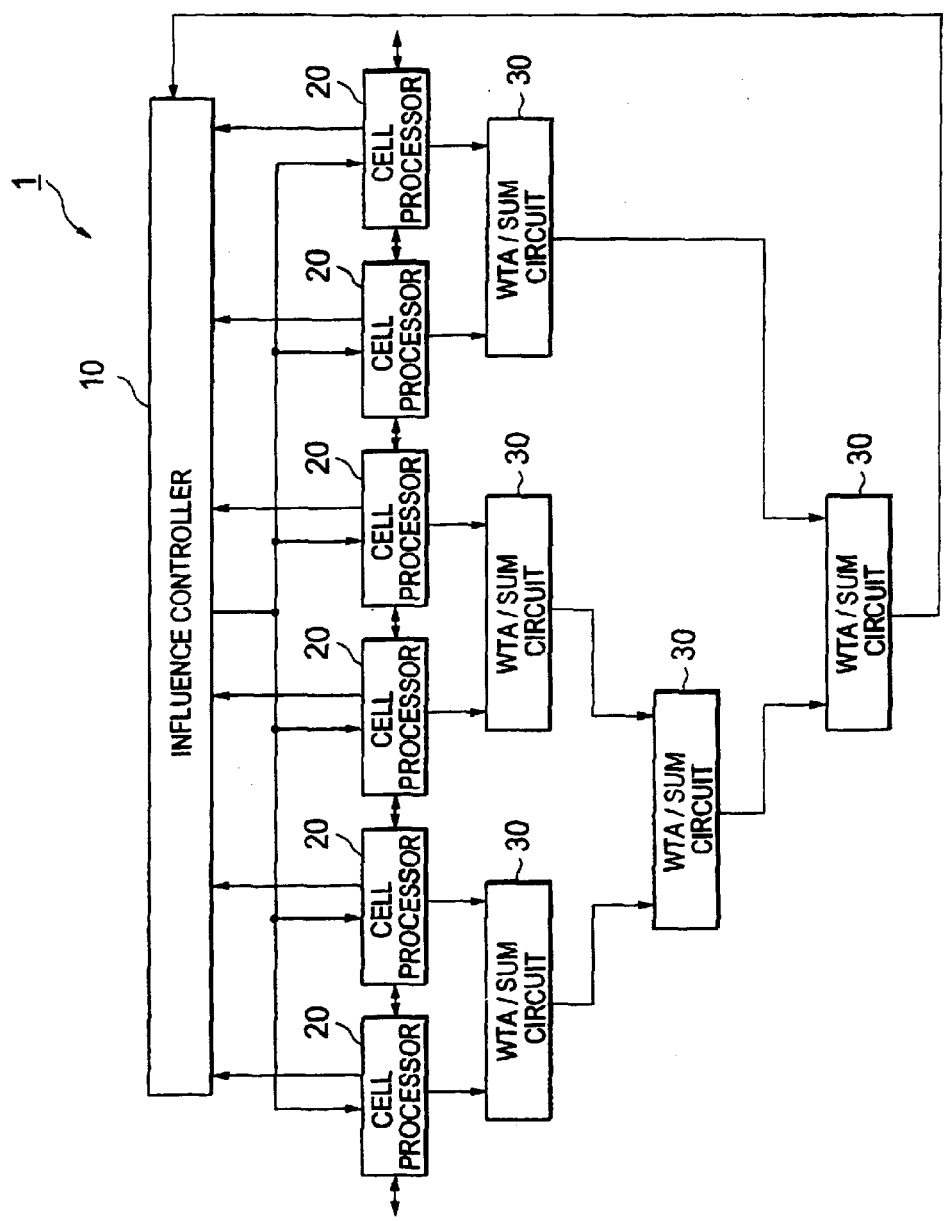
FIG. 1 is a general configuration view of a multi-processor system.

FIG. 1 is a general configuration view illustrating one example in which the image processing apparatus of the present invention is applied to a multi-processor system.

A multi-processor system 1 is composed of an influence controller 10, a plurality of cell processors 20, and a plurality of WTA (Winner Take All)/sum circuits 30.

The influence controller 10 and all cell processors 20 are connected to one another by a broadcast channel (communication channel that transmits a message to multiple recipients at the same time).

The controller of this invention is embodied by the influence controller 10 and WTA (Winner Take All)/sum circuits 30.

In the multi-processor system 1, a result of data processing of each cell processor 20, which is a status variable value for expressing the status of an object at a certain point, is managed by the influence controller 10. Then, the status variable value values of all cell processors 20 are transmitted to each cell processors 20 as an example of reference numeral value from the influence controller 10 via the broadcast. Since the status variable values are transmitted to each cell processor 20 via the broadcast, each cell processor 20 can obtain the status variable values generated by other cell processors 20 at high speed.

The status variable values are values that are obtained as a result of data processing carried out by the respective cell processors 20. Namely, the status variable values represent positional coordinates of the object expressed by CG, and the states of shape, color, and the like. The status variable value is generated using a fluctuation variable that changes at random such as a random number and the like so as to obtain a variable having a chaos-like fluctuation. The fluctuation variable is a value that can be obtained by, for example, an equation given as follows:

$$Rk+1=4*Rk*(1-Rk) \quad \text{[Equation 1]}$$

$$0<Rk<1$$

where Rk is a fluctuation variable.

The broadcast channel is a transmission channel between the influence controller 10 and the plurality of cell processors 20. The broadcast channel is composed of an address bus for sending an address, and a data bus for sending data such as the status variable value, which is the result of data processing of each cell processor. The address includes a cell address for specifying each cell processor 20 and a broadcast address for all cell processors 20. The cell address corresponds to an address (physical address or logical address) on memory, and the result of data processing of cell processor 20 is stored into memory at an address corresponding to the cell address indicating the corresponding cell processor 20. ID (identification) as identification data for identifying each processor is added to each cell processor 20. The cell address corresponds to this ID. This makes it possible for the cell address to represent from which cell processor 20 transmitting data is derived.

The plurality of WTA/sum circuits 30 is connected as illustrated in FIG. 1. Namely, WTA/sum circuits 30 are connected in a pyramidal shape using the side where the cell processors 20 are provided as a first stage. Two cell processors 20 are connected to the input terminals of the respective WTA/sum circuits 30 of the first stage. In the second stage and afterward, the outputs of two WTA/sum circuits 30 of the lower stage are connected to the respective input terminals of the first stage, and the input terminals of the WTA/sum circuits 30 of the upper stage are connected to the respective output terminals. The outputs of two WTA/sum circuits 30 of the lower stage are connected to the input terminals of the WTA/sum circuit 30 of the highest stage, and the output terminal of the WTA/sum circuit 30 of the highest stage is connected to the influence controller 10.

An explanation will be next given of each of the influence controller 10, cell processors 20, and WTA/sum circuits 30 in more detail.

Influence Controller

Figure 2:
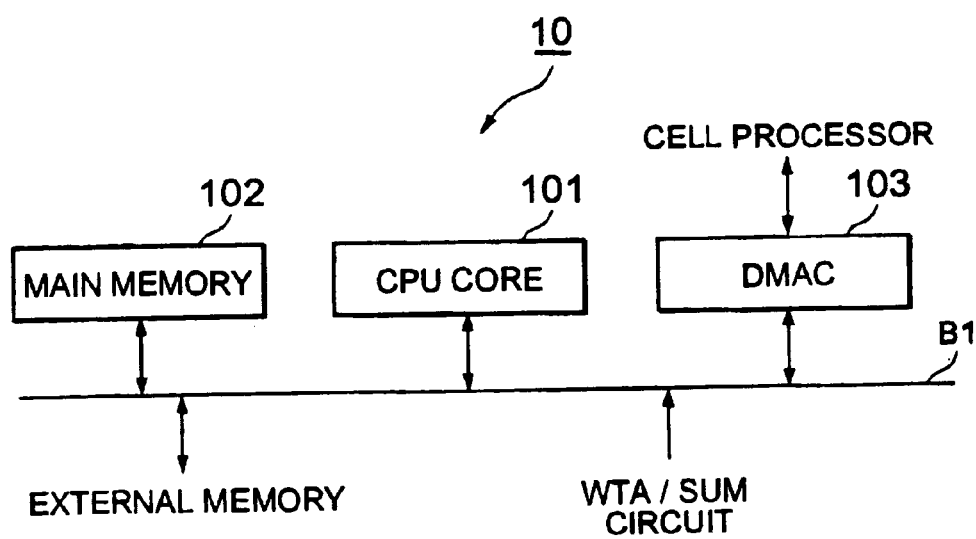
FIG. 2 is a configuration view of an influence controller.

The influence controller 10 broadcasts data to all cell processors 20 via the broadcast channel, receives status variable values of the respective cell processors 20, and holds them. FIG. 2 illustrates the configuration example of the influence controller 10.

The influence controller 10 is composed of a CPU (Central Processor Unit) core 101, which controls the operations of the entire multi-processor system 1, rewritable main memory 102 such as a SRAM (Static Random Access Memory), and a DMAC (Direct Memory Access Controller) 103 which are connected to one another by a bus B1. The output terminal of the WTA/sum circuit 30 of the highest stage, and external memory such as hard disks, transportable media and the like are connected to the bus B1.

The CPU core 101 reads a startup program from the external memory at an initiating time, and executes the startup program to operate an operating system. Also, the CPU core 101 generates broadcast data (reference numeral value) to be broadcasted to each cell processor 20 based on data read from the main memory 102. The broadcast data is one or a plurality of pairs of data having a status variable value and a cell address indicating the cell processor 20 that has calculated the corresponding status variable value.

Moreover, the CPU core 101 generates a constraint condition, which is a given condition to be used when each cell processor 20 produces the status variable value. The constraint condition refers to a condition for specifying the range of the value where the status variable value generated by the cell processor 20 is available. The constraint condition value is a fixed value with respect to each cell processor 20, and is derived from the status variable value of one previous cycle generated by each cell processor 20.

The main memory 102 is one that stores data such as the status variable value of each cell processor 20 and is used as common memory of the entire multi-processor system 1. The status variable value is stored at the address of the main memory 102 corresponding to the cell address of the cell processor 20 that has calculated the corresponding status variable value.

The DMAC 103 performs direct memory access transfer control between the main memory 102 and each cell processor 20. For example, the DMAC 103 broadcasts broadcast data to each cell processor 20 via the broadcast channel. Also, the DMAC 103 obtains the data processing results of the respective cell processors 20 individually and stores the results to the main memory 102.

Cell Processor

Figure 3:
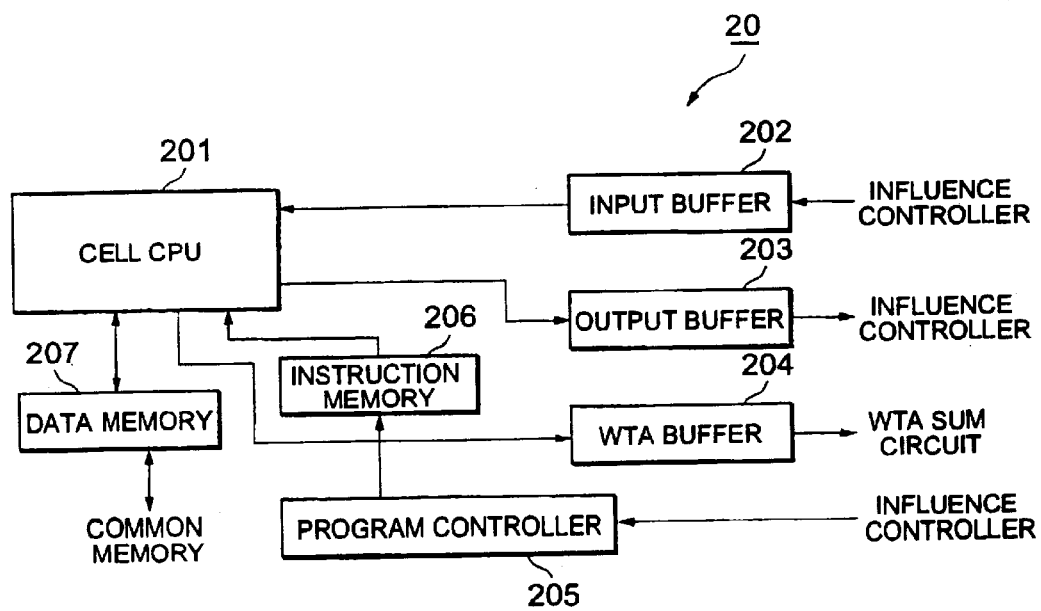
FIG. 3 is a configuration view of a cell processor.

Each cell processor 20 sorts out necessary data from broadcast data and performs data processing, and reports the result to the WTA/sum circuit 30 at the time of ending data processing. Each cell processor 20 sends the status variable value, which is the result of data processing, to the influence controller 10 in accordance with an instruction from the influence controller 10. The respective cell processors 20 are cascaded via the common memory (not shown). Each cell processor 20 may perform data processing on a synchronous clock. Also, each cell processor 20 may perform data processing on a different clock. FIG. 3 shows the configuration example of the cell processor 20.

The cell processor 20 is composed of a cell CPU 201, an input buffer 202, an output buffer 203, a WTA buffer 204, a program controller 205, instruction memory 206, and data memory 207.

The cell CPU 201 is a processor having a programmable floating-point calculator that controls the operation of the processor 20 to perform data processing.

The cell CPU 201 obtains broadcast data subjected to broadcasting from the influence controller 10 via the input buffer 202. Then, the cell CPU 201 determines whether or not obtained broadcast data is data necessary for processing that the cell CPU 201 should perform using the cell address of pair data. The cell CPU 201 writes the status variable value to the corresponding address of data memory 207, if necessary. Moreover, the cell CPU 201 reads the status variable value from the data memory 207 and performs data processing. Then, the cell CPU 201 writes the generated status variable value to the output buffer 204, and sends data, indicative of data processing, to the WTA/sum circuit 30.

The input buffer 202 is one that holds broadcast data subjected to broadcasting from the influence controller 10. Broadcast data held is sent to the cell CPU 201 in response to a request sent from the cell CPU 201.

The output buffer 203 is one that holds the status variable value of the cell CPU 201. The status variable value held is sent to the influence controller 10 in response to a request from the influence controller 10.

In addition to the above, the input buffer 204 and output buffer 203 may perform transmission and reception of data for control.

The WTA buffer 204 receives data, indicative of the end of data processing, from the cell CPU 201 at the time of ending data processing performed by the cell CPU 201. Then, the WTA buffer 204 transmits the received data to the WTA/sum circuit 30 to report the end of data processing thereto. Data, indicative of end of data processing, includes, for example, ID of its cell processor 20, and priority data that determines priority, which is necessary when the status variable value stored in the output buffer 203 is read to the influence controller 10.

The program controller 205 is one that fetches a program for defining the operation of the cell processor 20 from the influence controller 10. The program for defining the operation of the cell processor 20 includes a program for data processing executed by the cell processor 20, a data selective program for determining data necessary for processing executed by the corresponding cell processor 20. The program also includes a priority deciding program for deciding priority, which is necessary when the result of processing is read to the influence controller 10.

The instruction memory 206 stores the program fetched by the program controller 205. The stored program is read to the cell CPU 201 as required.

The data memory 207 is one that stores data processed by the cell processor 20. The broadcast data determined as being necessary by the cell CPU 201 is written therein. The broadcast data is stored into the data memory 207 at the address corresponding to the cell address. Moreover, according to this embodiment, a pair of a candidate status variable value and a comparison value is temporarily stored. Also, when a new status variable value is decided, a new status variable value is written at a given address.

Furthermore, according to this embodiment, a part of the data memory 207 extends to the cell processors 20 adjacent to each other via the common memory to make it possible to transmit/receive data to/from the adjacent cell processors for each cycle.

Figure 4:
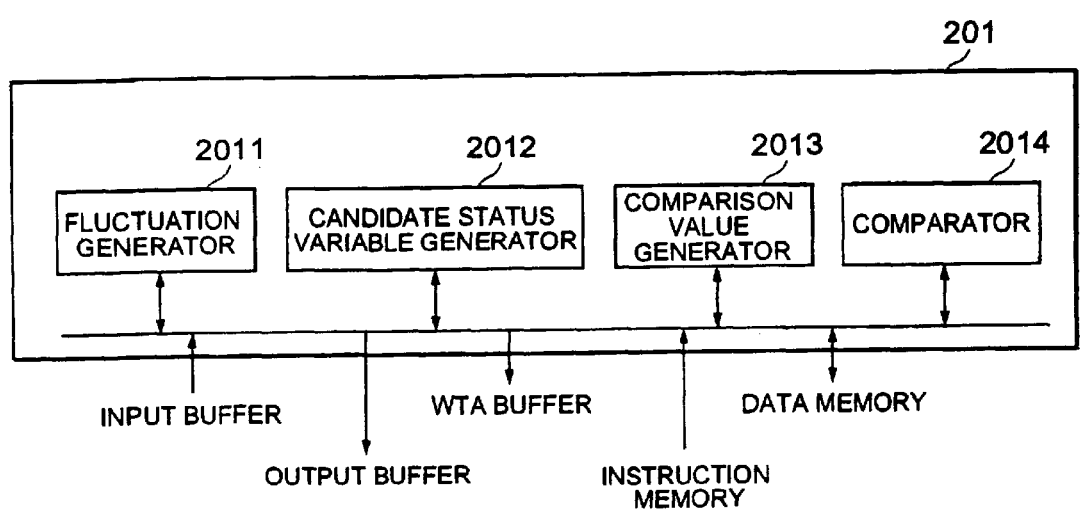
FIG. 4 is a functional block diagram of a cell CPU.

In the cell CPU 201, the function block, including a fluctuation generator 2011, a candidate status variable generator 2012, a comparison value generator 2013, and a comparator 2014, is formed by executing the computer program as illustrated in FIG. 4. This computer program is stored in the instruction memory 206, and is sent from the influence controller 10 via the program controller 205.

The fluctuation generator 2011 is one that generates a fluctuation variable based on, e.g., equation 1. The generated fluctuation variable is sent to the generator 2012.

The generator 2012 is one that generates a candidate status variable value, which is a candidate of the status variable value, based on the fluctuation variable. The generated candidate status variable value is sent to the comparison value generator 2013. The candidate status variable value is regarded as a status variable value by satisfying a given condition.

The comparison value generator 2013 compares a value, which is obtained by performing a given calculation using the candidate variable value generated by the generator 2012 and the status variable value sorted out from the broadcast data, with the constraint condition value, which is a given condition value inputted from the external unit, so as to derive a comparison value. The comparison value is a value indicating the extent to which the candidate status variable value is suitable for the status variable value of the cell processor 20 at the current point. For example, the comparison value is a differential value between the constraint condition value and the value, which is obtained by performing the calculation using the generated candidate status variable value and the sorted-out status variable value. The comparison value generator 2013 pairs the candidate status variable value with the comparison value, and stores it in the data memory 207. The comparison value generator 2013 counts the pairs of the candidate status variable value and the comparison value thus generated. The constraint condition value is captured from the influence controller 10 via, e.g., instruction memory 206.

The comparator 2014 detects a comparison value determined as being optimal from a plurality of comparison values. The comparison value determined being optimal results in the minimum comparison value when the comparison value is a differential value between the constraint condition value and the value, which is obtained by performing the calculation using the generated candidate status variable value and the sorted-out status variable value. When the optimal comparison value is detected, the comparator

2014 transmits data, indicative of the end of data processing, to the WTA buffer 204. Also, the comparator 2014 stores the candidate status variable value, serving as a new status variable value of its cell processor 20, to be paired with the comparison value determined as being optimal into the data memory 207 at a given address, and erases the other candidate status variable values and comparison values.

WTA/Sum Circuit

The plurality of WTA/sum circuits 30 determines the order in which the influence controller 10 captures the status variable value from the cell processor 20 based on data, indicative of the end of data processing sent from each cell processor 20, and reports it to the influence controller 10.

Figure 5:
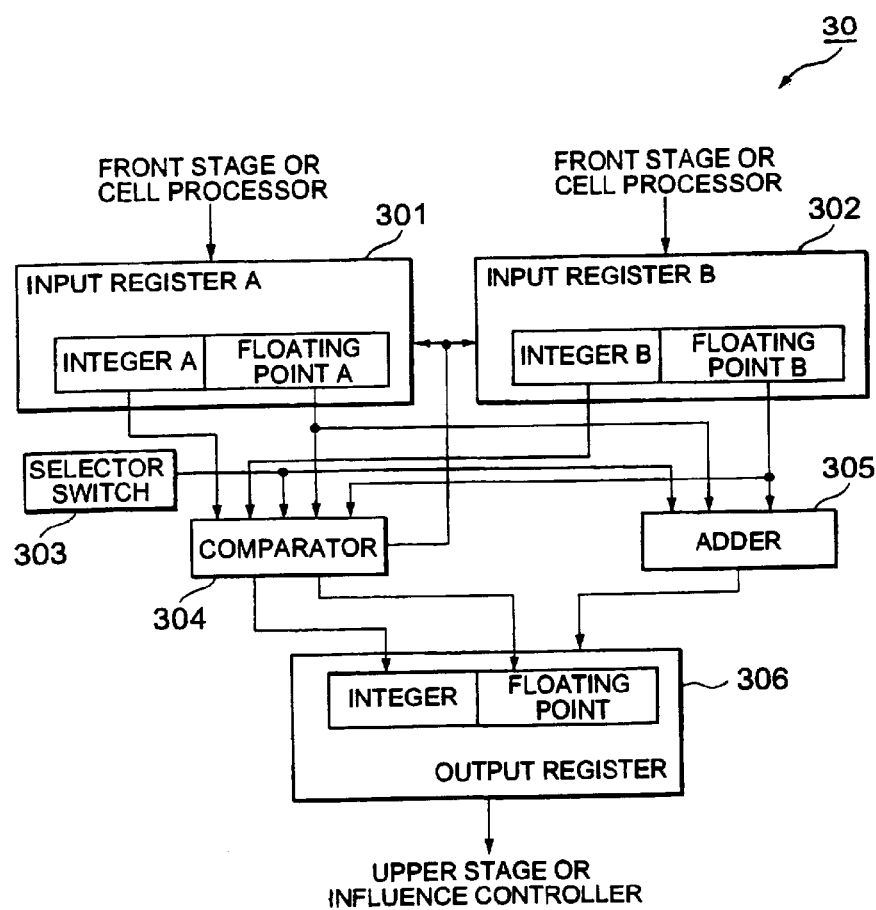
FIG. 5 is a configuration view of a WTA/sum circuit.

FIG. 5 illustrates the configuration example of the WTA/sum circuit 30.

Each WTA/sum circuit 30 is composed of two input registers A and B (hereinafter referred to first input register 301 and second input register 302), a selector switch 303, a comparator 304, an adder 305, and an output register 306.

Each of the first input register 301 and the second input register 302 has an integer register and a floating-point register. Among data, indicative of the end of data processing sent from each cell processor 20, for example, ID data is written into the integer register, and priority data is written into the floating-point register.

The selector switch 303 energizes either the comparator 304 or the adder 305. More specifically, the selector switch 303 makes it possible to use only one of them in accordance with an operation mode. The operation mode is determined by an instruction from, e.g., the influence controller 10. The operation mode will be described later.

The comparator 304 performs the comparison of the floating-point values, which are held by the floating-point registers of the first input register 301 and second input register 302. The comparator 304 writes a larger (or smaller) value and an integer attendant thereon to the output register 306.

The adder 305 calculates the sum of the floating-point values, which are held by the floating-point registers of the first input register 301 and second input register 302, and writes the result of calculation to the output register.

The output register 306 is configured in substantially the same way as the fist input register 301 and the second input register 302. Namely, the output register 306 comprises the integer register and the floating-point register. For example, ID data is written to the integer register and priority data is written to the floating-point register.

The WTA/sum circuit 30 has three operation modes set forth below.

Maximum Value (WTA) Mode

The comparator 304 is energized by the selector switch 303. The comparator 304 performs the comparison of the floating-point values A and B, which are held by the floating-point registers of the first input register 301 and second input register 302. The comparator 304 writes a larger (or smaller) value and an integer attendant thereon to the output register 306. When the writing to the output register 306 is ended, the first input register 301 and the second input register 302 are cleared. The content of the output register 306 is written to the input register of the WTA/sum circuit 30 of the upper stage. At this time, if the input register as a writing destination is not cleared, the writing is stalled and no writing is performed at this cycle. For this reason, the content of the output register 306 is designed to be written at a next cycle.

Addition Mode

The adder 305 is energized by the selector switch 303. The adder 305 calculates the sum of the floating-point values A and B, which are held by the floating-point registers of the first input register 301 and second input register 302. Then, the adder 305 writes the calculation result to the output register 306. The content of the output register 306 is written to the-input register of the WTA/sum circuit 30 of the upper stage.

Approximate Sort Mode

The comparator 304 is energized by the selector switch 303. The comparator 304 performs the comparison of the floating-point values A and B, which are held by the floating-point registers of the first input register 301 and second input register 302. The comparator 304 writes a larger (or smaller) value and an integer attendant thereon to the output register 306. Thereafter, only the input register, which holds the value written in the output register 306, is cleared. The content of the output register 306 is written to the input register of the WTA/sum circuit 30 of the upper stage. If the input register as a writing destination is not cleared, the writing is stalled and no writing is performed at this cycle. In addition, the writing operation from the output register 306 of the WTA/sum circuit 30 of the lower stage is performed.

By the approximate sort mode, data, which the influence controller 10 receives from the WTA/sum circuit 30 of the highest stage, is sorted in order of increasing or decreasing the floating-point values.

Additionally, the first input registers 301, second input registers 302, and output registers 306 of all WTA/sum circuits 30 are cleared.

Embodiment 1

Figure 6:
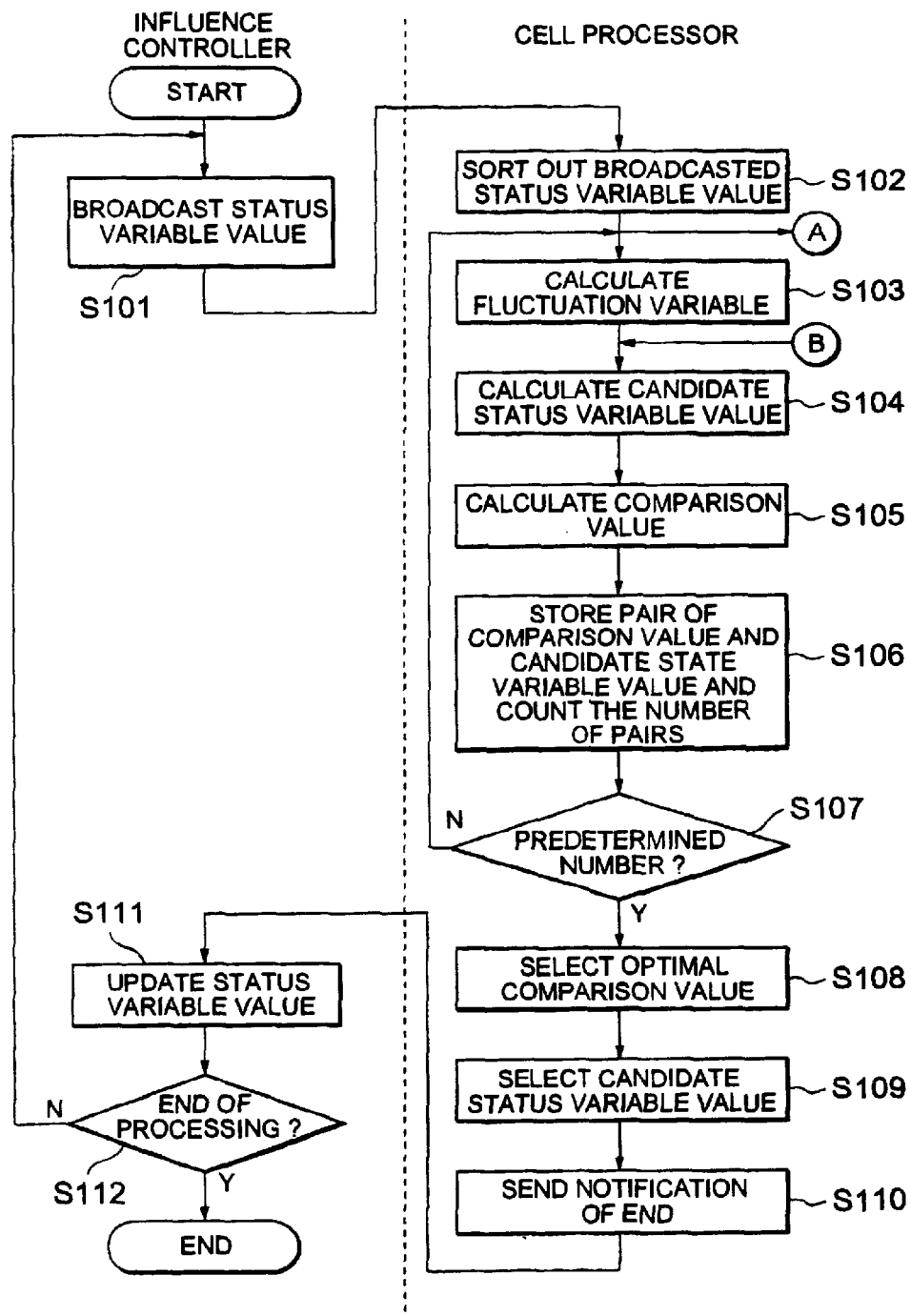
FIG. 6 is a flowchart of a first embodiment.

This embodiment explains the case in which the status variable value is updated based on the restraint condition value set for each cell processor 20. FIG. 6 is a flowchart illustrating such processing.

This example explains a case of such an animation wherein a plurality of objects moves as keeping the distance constant each other. It is assumed that positional coordinates that represent the position of object are expressed by orthogonal coordinates X, Y, Z, and that the positional coordinates of one object are calculated by one cell processor. The positional coordinates of kth cycle to be processed by ith cell processor are expressed by $(X_{i,k}, Y_{i,k}, Z_{i,k})$. In this case, the positional coordinates are status variable values.

The influence controller 10 reads the positional coordinates of each object, which are the status variable values of the respective cell processors 20, from the main memory 102 and broadcasts the result to all cell processors 20 (step S101). Each cell processor 20 sorts out only the position coordinates necessary for its processor (step S102). For example, the cell processor 20 selects positional coordinates $(X_{j,k}, Y_{j,k}, Z_{j,k})$ with a cell address of the processor that performs processing about the object close to the object processed by its processor from among the broadcasted positional coordinates.

Next, each cell processor 20 generates a fluctuation variable of each of X, Y, Z coordinates (step S103). The fluctuation variable can be generated based on, e.g., the following equation.

$$A_{i,k+1} = 4 * A_{i,k} 8(1 - A_{i,k})$$
$$B_{i,k+1} = 4 * B_{i,k} 8(1 - B_{i,k})$$
$$C_{i,k+1} = 4 * C_{i,k} * (1 - C_{i,k})$$
$$0 < A_{i,k} < 1,\ 0 < B_{i,k} < 1,\ 0 < C_{i,k} < 1 \quad \text{[Equation 2]}$$

The cell processor 20 generates candidate status variable values $X_{i,k+1}, Y_{i,k+1}, Z_{i,k+1}$ using the fluctuation variable thus generated (step S104). For example, the candidate status variable values are generated based on the equation set forth below. In this equation, candidate status variable values Xi, k+1, Yi, k+1, Zi, k+1 are generated based on the sum of fluctuation variables Ai, k+1, Bi, k+1, Ci, k+1 and the status variable values Xi, k, Yi, k, Zi, k of one previous cycle.

$$Xi, k+1=Ai, k+1+Xi, k \quad \text{[Equation 3]}$$

$$Yi, k+1=Bi, k+1+Yi, k$$

$$Zi, k+1=Ci, k+1+Zi, k \quad \text{[Equation 3]}$$

Each cell processor 20 calculates a comparison value K from a value, which is obtained from the generated candidate status variable values (Xi, k+1, Yi, k+1, Zi, k+1) and the sorted-out status variable values (Xj, k, Yj, k, Zj, k), and a constraint condition value L. For example, the comparison value K is calculated from, e.g., the equation described below (step S105). The comparison value K and the candidate status variable value used at this time are stored in the data memory 207 as one pair. Additionally, the cell processor 20 counts the number of pairs of the comparison value K and the candidate status variable value (step S106).

$$K=SQRT((Xj, k-Xi, k+1)^2+Xj, k-Yi, k+1)^2+Zj, k-Zi, k+1)^2-L \quad \text{[Equation 4]}$$

The constraint condition value L is a numeral value, which is unique to each cell processor 20. For example, the constraint condition value L is a fixed distance that is kept between an object, which is to be subjected to the calculation of positional coordinates by the corresponding cell processor, and the other object. The constraint condition value L is included in the program and inputted to each cell processor 20 in advance from the influence controller 10. In other words, the constraint condition value L is a numeral value, which is predetermined by the designer at the designing time or the input from the outer unit.

The comparison value K is a difference between a distance, which is between the positional coordinate of k+1th cycle processed by ith cell processor and the positional coordinate of kth cycle processed by jth cell processor, and the constraint condition value L.

Xj, k, Yj, k, Zj, k are the sorted-out status variable values and represent the status variable values showing the positional coordinates of kth cycle of jth cell processor 20.

The cell processor 20 determines whether or not the number of pairs of the comparison value K and the candidate status variable value reaches a predetermined number (step S107).

As a result of the determination, when it does not reach the predetermined number, the operation goes back to step S103 and the cell processor 20 generates the fluctuation variable to produce a pair of a candidate status variable value and a comparison value (step S107: N).

When it reaches the predetermined number (step S107: Y), the cell processor 20 detects comparison value K having the smallest absolute value (step S108) to specify a candidate state variable value to be paired with the comparison value K (sep S109). The specified candidate status variable value becomes a new status variable value for this cell processor 20. New positional coordinates of the object are determined based on a new status variable value.

When the new status variable value is determined, the cell processor transmits an end notification indicating the determination of new status variable value to the WTA/sum circuit 30 (step S110). The end notification is a notification including ID showing its processor.

When the WTA/sum circuit 30 receives the end notification from the cell processor 20, the WTA/sum circuit 30 operates in an approximate sort mode to send the end notification to the influence controller 10 in order of the reception. The influence controller 10 specifies the cell processor 20, having the determined new status variable value from the end notification, to obtain a new status variable value from the corresponding processor 20 and update the status variable value of the corresponding processor 20, which is held by the main memory 102 (step S111).

Sequentially, the positional coordinates of the object in the next cycle are derived. For this end, a series of processing is performed again from step S101. Such processing is continued to generate an image wherein the object moves continuously. A series of processing is continued until the instruction of end is sent to the multi-processor system 1 from the outer unit (step S112).

Since the status variable values (positional coordinates) of the objects are determined by use of the fluctuation variables, chaos-like expression is possible, and more natural motion is possible. Moreover, the predetermined number of candidate status variable values and that of comparison values K are derived, and an optimal candidate status variable value to be paired with the comparison K is selected from among them to determine the status variable value. This makes it possible to provide an animation that satisfies the condition in which the objects moves as keeping the distance therebetween constant even if the fluctuation variable is used.

Additionally, in the case where the status variable value and comparison value K are derived and the comparison value K satisfies the constraint condition value L, the candidate status variable value may be used as a new status variable value at this time without generating the predetermined number of candidate status variable values. In this case, the constraint condition value L may be expressed within a predetermined range.

Here, in the case where jth cell processor 20 used in the equation of constraint condition is connected to ith cell processor 20 via common memory, it is unnecessary for the influence controller 10 to obtain the status variable value of jth cell processor 20 by broadcasting. Instead of this, the status variable value may be obtained via common memory.

Embodiment 2

Figure 7:
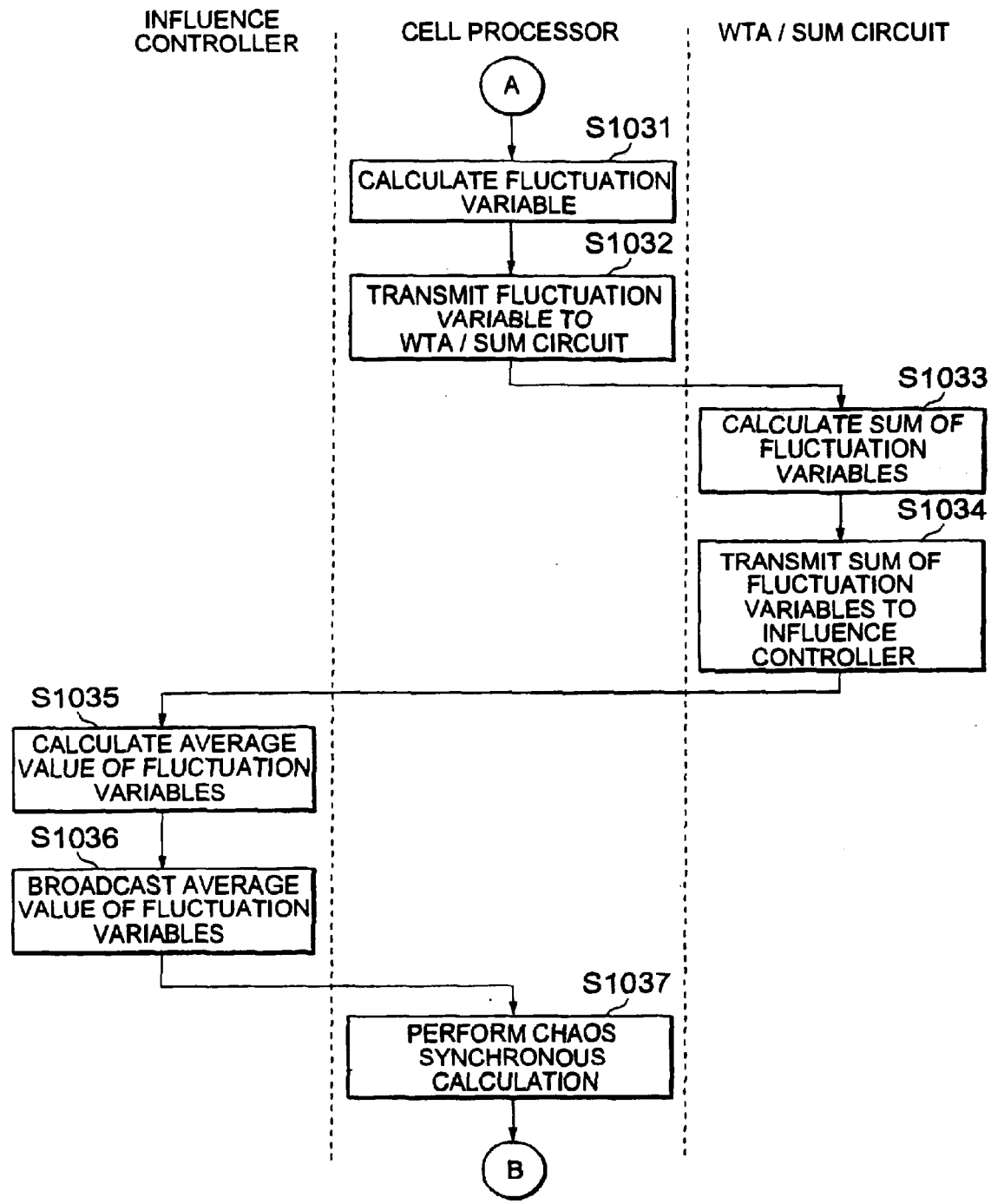
FIG. 7 is a flowchart of a second embodiment.

This embodiment explains the case in which the cell processor 20 generates the fluctuation variable due to chaos synchronous phenomenon by reflecting an influence from the other cell processor on the fluctuation variable value at the time of calculating the fluctuation variable. FIG. 7 is a flowchart illustrating such processing.

Additionally, this embodiment is different from processing illustrated in Embodiment 1 in the fluctuation variable calculation step (step S103), and only this step will be explained.

When each cell processor 20 finishes sorting out the status variable value from broadcast data (step S102), each cell processor 20 generates fluctuation variables Ai, tmp, Bi, tmp, Ci, tmp (step S1031). The fluctuation variables are generated by the equation set forth below.

$$Ai, tmp=4*Ai, k*(1-Ai, k) \quad \text{[Equation 5]}$$

$$Bi, tmp=4*Bi, k*(1-Bi, k)$$

$$Ci, tmp=4*Ci, k*(1-Ci, k)$$

When generation of the fluctuation variables is ended, the generated fluctuation variables are sent to the WTA/sum circuit 30 (step S1032).

When receiving the fluctuation variables from the respective cell processor 20, the WTA/sum circuit 30 operates in the addition mode Then, the WTA/sum circuit 30 obtains the sum of the fluctuation variables and transmits it to the influence controller 10 (steps S1033, S1034).

The influence controller 10 receives the sum of the fluctuation variables and divides it by the number of cell processors to calculate average values AveA, k, AveB, k, AveC, k (step S1035). The calculated average values of the fluctuation variables are broadcasted to all cell processors 20 (step S1036)

The respective cell processors 20 perform chaos synchronous calculation using the broadcasted average values of the fluctuation variables (step S1037). The chaos synchronous calculation is performed by the following equation described below:

$$Ai, k+1 = \alpha^* Ai, tmp + \beta^* AveA, k+\gamma^* Ai+1, tmp$$
$$Bi, k+1 = \alpha^* Bi, tmp + \beta^* AveB, k+\gamma^* Bi+1, tmp$$
$$Ci, k+1 = \alpha^* Ci, tmp + \beta^* AveC, k+\gamma^* Ci+1, tmp$$
$$\alpha+\beta+\gamma=1 \qquad \text{[Equation 6]}$$

As fluctuation variables obtained by the chaos synchronous calculation, there are used fluctuation variables generated in step S1031, average values of fluctuation variables generated by the respective cell processors 20, fluctuation variables generated by the adjacent cell processor. Namely, the fluctuation variables generated by the other cell processors exert an influence upon fluctuation variables obtained by the chaos synchronous calculation. Additionally, the fluctuation variables generated by the adjacent cell processor may be received from the influence controller 10 via the broadcast channel together with the average values of fluctuation variables. They may be directly received from the adjacent cell processor via common memory.

The respective cell processors 20 generate candidate status variable values using fluctuation variables Ai, k+1, Bi, k+1, Ci, k+1 to which chaos synchronous calculation is added (step S104).

By controlling values $\alpha$, $\beta$, $\gamma$, the fluctuation variables of the designated cells are synchronized or shifted to make it possible to show them like a group of cells partially.

The fluctuation variables themselves are originally generated by the respective cell processors 20. For this reason, the candidate status variable values obtained from the fluctuation variables are calculated independently of one another by the cell processors 20. For this end, as explained in this embodiment, the average values of the fluctuation variables of the plurality of cell processors 20 are calculated and the results are used. The components of the fluctuation variables of the respective cell processors 20 are fed back to make it possible to perform chaos synchronous calculation.

The use of chaos synchronous phenomenon can provide an animation that performs motion more close to the actual biological motion. Namely, such motion that moves in a group is possible, resulting in the motion like a biological motion as a whole.

Embodiment 3

Figure 8:
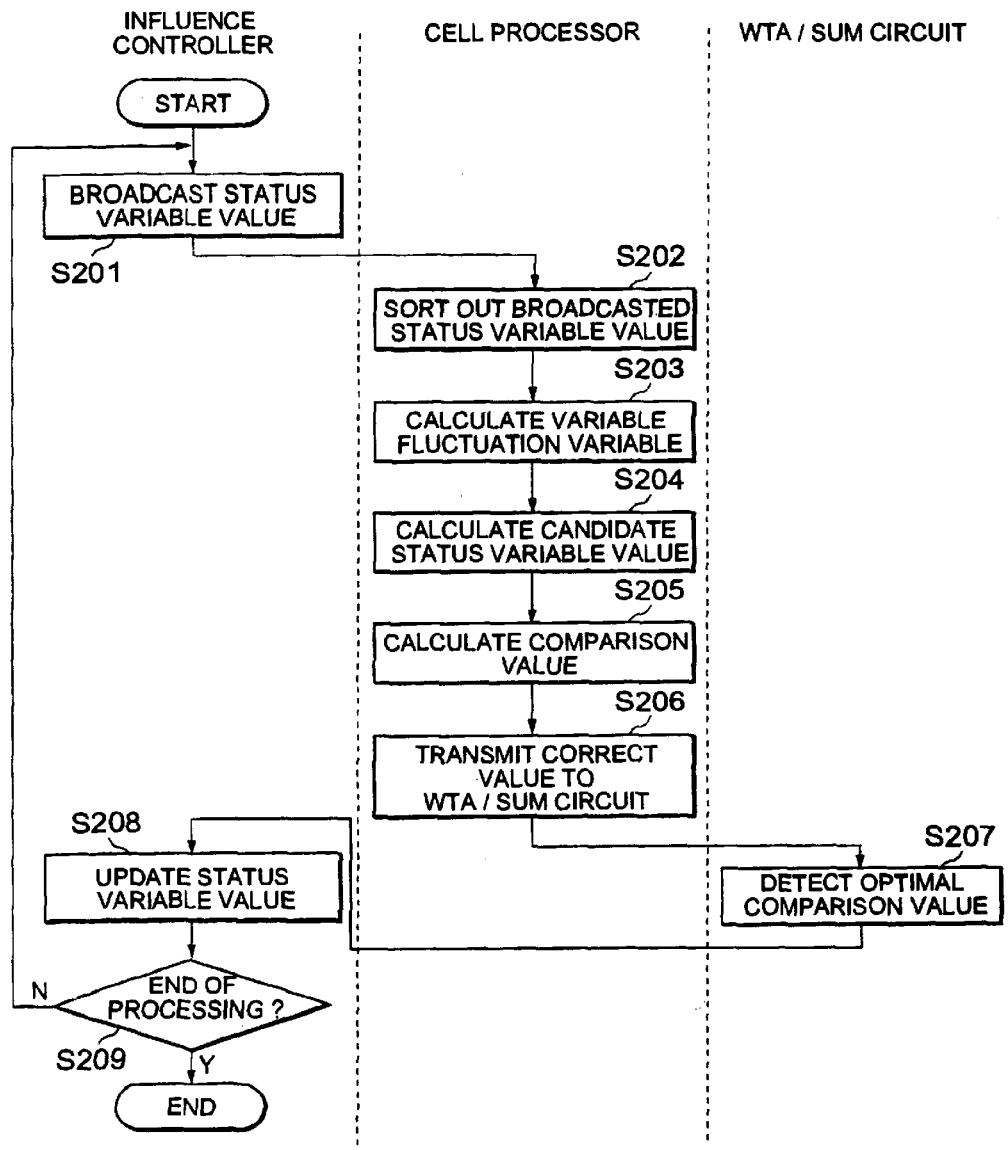
FIG. 8 is a flowchart of a third embodiment.

This embodiment explains the case in which the plurality of cell processors 20 updates the status variable values using the same constraint condition value. FIG. 8 is a flowchart illustrating such processing.

N cell processors form one group. In one group, each of n cell processors 20 that form one group derives the candidate status variable value, and an optimal status variable value is selected from among the derived status variable values.

The influence controller 10 reads the status variable values of the respective cell processor 20 from the main memory to broadcast them to all cell processors 20 (step S201). Each cell processor 20 sorts out only the status variable value necessary for its processor from among the broadcasted status variable values (step S202). Each of n cell processors 20 that form one group sorts out the same status variable value.

The respective cell processors 20 generate fluctuation variables (step S203). The processors 20 generate candidate status variable values from the generated fluctuation variables (step S204), respectively. Then, the processors 20 generate comparison values K from the generated candidate status variable values and sorted-out status variable value (step S205). Generations of fluctuation variables, candidate status variable values and comparison values K are given by equations 2, 3, and 4.

The cell processors 20 that form one group generate fluctuation variables, candidate status variable values and comparison values K by the same equation. Regarding the fluctuation variables, an initial value is changed so that different fluctuation variables may be generated by the respective cell processor 20.

The candidate status variable values are stored to the data memory 207 and output buffer 203. The comparison values K are transmitted to the WTA/sum circuit 30 together with ID indicating its cell processor (step S206).

The WTA/sum circuit 30 operates in the maximum value mode, selects an optimal comparison value K from the pair of N comparison values K and IDs sent from one group, and transmits the corresponding ID to the influence controller 10. The candidate status variable value, which is generated by the cell controller 20 to be specified by ID and which is paired with the optimal comparison K, becomes a new status variable value of this group.

The influence controller 10 specifies the cell processor 20 based on ID sent from the WTA/sum circuit 30. Then, the influence controller 10 takes the candidate status variable value from the specified cell processor 20, and updates the status variable value of the corresponding address of the main memory 102 (step S208).

Sequentially, the status variable value of the next cycle is derived. For this end, a series of processing is performed from the step S201 again. A series of processing is continued to generate an image wherein the object moves continuously. A series of processing is continued until the instruction of end is sent to the multi-processor system 1 from the outer unit (step S209).

The above-explained processing makes it possible to obtain the optimal status variable value more quickly than Embodiments 1 and 2 in which the plurality of candidate state variable values is generated by one cell processor 20 and the optimal status variable value is selected therefrom.

Moreover, each cell processor 20 performs processing as illustrated in steps S103 to S109 of Embodiment 1, generates a plurality of candidate status variable values and detects an optimal status variable value from among them. Moreover, an optimal status variable value may be selected from among the status variable values each detected as an optimal by each cell processor 20. This makes it possible to detect more optimal status variable value.

Processing explained in Embodiments 1 to 3 may be alternately performed in one multi-processor system 1. For example, processing in Embodiments 1 to 3 may be performed at every one cycle by one cell processor 20.

According to the multi-processor system wherein the influence controller 10 broadcasts the status variable value and each of the cell processors 20 sorts out the necessary status variable value, the above can be easily implemented by appropriately controlling the status variable value sorted out by each cell processor 20.

Moreover, uniform random numbers are used as fluctuation variables and a physical energy equation is used as a constraint condition, so that the method, which is equivalent to normal Monte Carlo method, can be obtained.

Figure 9:
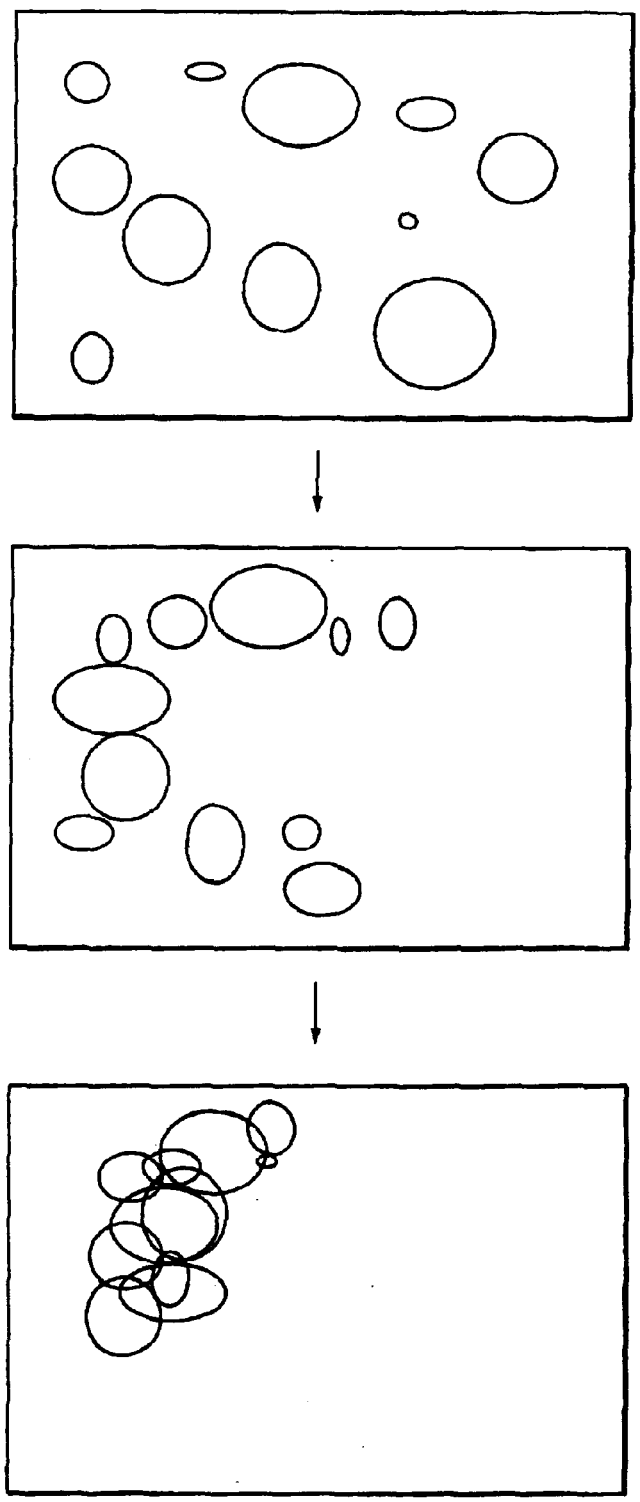
FIG. 9 is a view illustrating a status transition of objects generated by the present invention.

FIG. 9 is a view illustrating operations of objects by the object data processing method of the present invention. This shows the state in which a plurality of objects performs uniform operation gradually as processing advances.

The method of Embodiment 1 is executed after deciding the constraint condition of the respective objects in which a distance between objects is set and each object moves within this distance. When the distance between the objects is narrowed as processing advances, the objects are brought into one location gradually.

As illustrated in FIG. 9, as processing advances, the circular or oval objects originally scattered over the entire screen assemble at the left portion on the screen gradually. Resultantly, such an image that is formed by combining these objects into one object can be obtained. If the respective objects are expressed by the same color, the objects separated from each other are brought into one location gradually, resulting in such an image that is formed by combining these objects into one object.

Herein, the method of Embodiment 2 is executed. Namely, the objects are influenced each other in connection with their motion. The plurality of objects performs the same motion regardless of using the fluctuation variables.

Such an image that is formed by bringing the plurality of objects into one location with the same motion can be obtained together with the method of Embodiment 1. Since the respective objects move to be influenced to each other, there can be obtained an image in which the plurality of objects moves as one object to be suited to accomplishing an end.

Since the positions of the respective objects are determined by optimal status variable values, an image in which the respective objects assemble with a natural behavior can be obtained. Additionally, if the method of Embodiment 3 is executed, the number of processable objects is reduced, but the same processing as Embodiment 1 can be executed more quickly.

As is obvious from the above explanation, according to the present invention, it is possible to express the object image that perform motion naturally as compared with the conventional method, and to improve quality of entertainment for a person who views the object image. Moreover, the present invention is applied to an apparatus having a controller, which performs two-way communication between a plurality of processors and each processor, making it possible to process an image that moves as being associated with the plurality of objects images at high speed.

Various embodiments and changes may be made thereunto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. An image processing method executed in an apparatus for generating object data to express the status of an object image, the method comprising the steps of:

generating a predetermined number of candidate status variable values that fix a status of the object image at a certain point using a randomly changeable fluctuation value;

determining a first candidate status variable value from the predetermined number of candidate status variable values, said first candidate status variable value having the highest consistency with a predetermined condition value for the object image at the certain point; and generating the object data at the certain point based on the first candidate status variable value.

2. The image processing method according to claim 1, wherein the randomly changeable fluctuation value is repeatedly generated in time sequence using a fluctuation variable changeable within a given range.

3. An image processing method, executed in an apparatus having a controller and a plurality of processors, said apparatus performing two-way communication between the plurality of processors and the controller, for generating object data to express the status of object images generated respectively by the plurality of processors, the method comprising the steps of:

using one or more of the plurality of processors to each generate a plurality of respective candidate status variable values that fix a status of an object image generated by the one processor at a certain point and to transmit a selected one of the candidate status variable values to the controller based upon a quantified relative relationship between the candidate status variable values and one of a plurality of reference numerical values, said selected candidate status variable value being used by the one processor to generate the object data at the certain point;

using the controller to broadcast the reference numeral values to all of the plurality of processors at the same time, said reference numerical values including selected candidate status variable values; and wherein the quantified relative relationship for each of the one or more processors is within a predetermined range unique to the corresponding processor.

4. The image processing method according to claim 3, wherein each of the one or more processors generates a respective fluctuation variable changeable within a given range to produce the respective candidate status variable values based on the respective fluctuation variable, whereby the one or more processors generate the object data to express the object image in a random manner.

5. The image processing method according to claim 4, further comprising transmitting the fluctuation variables to the controller, using the controller to obtain an average value of all the received fluctuation variables and to broadcast the average value to the one or more processors, and using the one or more processors to generate the respective candidate status variable values based on the average value and the respective fluctuation variable.

6. The image processing method according to claim 3, wherein the plurality of processors is divided into one or more groups, and a selected candidate status variable value is determined by the processors in one group and is used as a common selected status variable value by all of the processors belonging to that group.

7. An image processing method, executed in an apparatus having a controller and a plurality of processors, said apparatus performing two-way communication between the plurality of processors and the controller, for generating object data to express the status of object images generated respectively by the plurality of processors, the method comprising the steps of:

using one or more of the plurality of processors to each generate a predetermined number of respective candidate status variable values that fix a status of an object image generated by the one processor and to transmit to the controller a first candidate status variable value having the highest consistency with one of a plurality of predetermined condition values, said one predetermined condition value corresponding to the one processor and said first candidate status variable value being used by the one processor to generate the object data;

using the controller to broadcast reference numerical values including first candidate status variable values to all of the plurality of processors at the same time for determining the predetermined condition values; and wherein the predetermined condition value corresponding to each of the one or more processors is unique to the corresponding processor.

8. The image processing method according to claim 7, wherein each of the one or more processors generates a respective fluctuation variable changeable within a given range to produce the respective candidate status variable values based on the respective fluctuation variable, whereby the one or more processors generate the object data to express the object image in a random manner.

9. The image processing method according to claim 8, further comprising transmitting the fluctuation variables to the controller, using the controller to obtain an average value of all the received fluctuation variables and to broadcast the average value to the one or more processors, and using the one or more processors to generate the respective candidate status variable values based on the average value and the respective fluctuation variable.

10. The image processing method according to claim 7, wherein the plurality of processors is divided into one or more groups, and a first candidate status variable value is determined by the processors in one group and is used as a common first status variable value by all of the processors belonging to that group.

11. An image processing apparatus, which generates object data to express the status of an object image, the apparatus comprising:

a processor for generating a predetermined number of candidate status variable values that fix a status of the object image at each of a plurality of points in time sequence using a fluctuation variable changeable within a given range; and a processor for determining for each point a first candidate status variable value having the highest consistency with a predetermined condition value from among the predetermined number of generated candidate status variable values for said point and for generating the object data at the point based on the first candidate status variable value, whereby the object image is expressed in a random manner.

12. An image processing apparatus, which has a controller and a plurality of processors, said apparatus performing two-way communication between the plurality of processors and the controller, for generating object data to express the status of object images generated respectively by the plurality of processors, at least one of the plurality of processors comprising:

a processing apparatus for generating candidate status variable values that fix a status of an object image at a certain point;

a transmitter and receiver for transmitting the generated candidate status variable values to the controller and for receiving reference numeral values from the controller, said reference numerical values including selected candidate status variable values transmitted from the processors; and a processing apparatus for quantifying a relative relationship between at least one of the received reference numeral values and the generated candidate status variable values for determining a selected candidate status variable value for the point and to generate the object data at the point based on the selected candidate status variable value, wherein the quantified relative relationship is within a predetermined range unique to the at least one processor.

13. An image processing apparatus, which has a controller and a plurality of processors, said apparatus performing two-way communication between the plurality of processors and the controller, for generating object data to express the status of object images generated respectively by the plurality of processors, at least one of the plurality of processors comprising:

a processing apparatus for generating a predetermined number of candidate status variable values that fix a status of an object image at a certain point and for specifying a first candidate status variable value having the highest consistency with a predetermined condition value;

a transmitter and receiver for transmitting the specified first candidate status variable value to the controller and for receiving reference numeral values from the controller, said reference numerical values including first candidate status variable values transmitted from the processors; and a processing apparatus for quantifying a relative relationship between at least one of the received reference numeral values and the candidate status variable values and for generating the object data at the point based on the first candidate status variable value, wherein the quantified relative relationship is within a predetermined range unique to the at least one processor.

14. A computer program for causing a computer system to serve as an image processing apparatus for generating object data to express the status of an object image, the image processing apparatus, under the control of the computer program, comprising:

a processor for generating a predetermined number of candidate status variable values that fix a status of the object image at each of a plurality of points in time sequence using a fluctuation variable changeable within a given range; and a processor for determining for each point a first candidate status variable value having the highest consistency with a predetermined condition value from among the predetermined number of generated candidate status variable values for said point and for generating the object data at the point based on the first candidate status variable value, whereby the object image is expressed in a random manner.

15. The computer program according to claim 14, wherein the computer program is stored in a computer-readable storage medium.

16. A computer program for causing a computer system to serve as an image processing apparatus, the image processing apparatus having a controller and a plurality of processors and, under the control of the computer program, performing two-way communication between the plurality of processors and the controller and generating object data to express the status of an object image generated by the plurality of processors, at least one of the plurality of processors, under the control of the computer program, comprising:

- a processing apparatus for generating candidate status variable values that fix a status of an object image at a certain point;
- a transmitter and receiver for transmitting a selected one of the generated candidate status variable values to the controller and for receiving reference numerical values from the controller, said reference numerical values including selected candidate status variable values transmitted from the processors; and
- a processing apparatus for quantifying a relative relationship between the received reference numeral values and the generated candidate status variable values and to generate the object data at the point based on the selected candidate status variable value, wherein the quantified relative relationship is within a predetermined range unique to the at least one processor.

17. The computer program according to claim 16, wherein the computer program is stored in a computer-readable storage medium.

18. A computer program for causing a computer system to serve as an image processing apparatus, the image processing apparatus having a controller and a plurality of processors and, under the control of the computer program, performing two-way communication between the plurality of processors and the controller and generating object data to express the status of an object image generated respectively by the plurality of processors, at least one of the plurality of processors, under the control of the computer program, comprising:

- a processing apparatus for generating a predetermined number of candidate status variable values that fix a status of an object image at a certain point and for specifying a first candidate status variable value having the highest consistency with a predetermined condition value;
- a transmitter and receiver for transmitting the specified first candidate status variable value to the controller and for receiving reference numeral values from the controller, said reference numerical values including first candidate status variable values transmitted from the processors; and
- a processing apparatus for quantifying a relative relationship between at least one of the received reference numeral values and the candidate status variable values and for generating the object data at the point based on the first candidate status variable value, wherein the quantified relative relationship is within a predetermined range unique to the at least one processor.

19. The computer program according to claim 18, wherein the computer program is stored in a computer-readable storage medium.

* * * * *

UNITED STATES PATENT AND TRADEMARK OFFICE
CERTIFICATE OF CORRECTION

PATENT NO.   : 6,757,448 B2
DATED        : June 29, 2004
INVENTOR(S)  : Nobuo Sasaki It is certified that error appears in the above-identified patent and that said Letters Patent is hereby corrected as shown below:

<u>Title page</u>,
Item [57], ABSTRACT,
Line 7, after "10" insert -- which --.
Line 16, after "influenced" insert -- by --.

<u>Column 1</u>,
Line 47, "are" should read -- is --.

<u>Column 4</u>,
Line 33, after "least" insert -- one --.
Line 55, after "image" delete "that".

<u>Column 7</u>,
Line 40, after "each" insert -- of the --.

<u>Column 11</u>,
Line 42, "fist" should read -- first --.

<u>Column 12</u>,
Line 60, "Ai, k+1 = 4 * Ai, k 8 (1 - Ai, k)" should read -- Ai, k+1 = 4 * Ai, k *
(1 - Ai, k) --.

<u>Column 13</u>,
Line 14, after "value" delete ",".

<u>Column 17</u>,
Line 28, after "are influenced" insert -- by --.
Line 46, "perform" should read -- performs --.

UNITED STATES PATENT AND TRADEMARK OFFICE
CERTIFICATE OF CORRECTION

PATENT NO. : 6,757,448 B2
DATED : June 29, 2004
INVENTOR(S) : Nobuo Sasaki

It is certified that error appears in the above-identified patent and that said Letters Patent is hereby corrected as shown below:

Column 17,
Line 56, after "embodiment" insert -- is --.

Signed and Sealed this

Twelfth Day of October, 2004

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,757,448 B2 | |
| APPLICATION NO. | : 09/933611 | |
| DATED | : June 29, 2004 | |
| INVENTOR(S) | : Nobuo Sasaki | |

It is certified that error appears in the above-identified patent and that said Letters Patent is hereby corrected as shown below:

<u>Title page</u>,
Item [57], ABSTRACT,
Line 7, after "10" insert -- which --.
Line 16, after "influenced" insert -- by --.

<u>Column 1</u>,
Line 47, "are" should read -- is --.

<u>Column 4</u>,
Line 33, after "least" insert -- one --.
Line 55, after "image" delete "that".

<u>Column 7</u>,
Line 40, after "each" insert -- of the --.

<u>Column 11</u>,
Line 42, "fist" should read -- first --.

<u>Column 12</u>,
Line 60, "Ai, k+1 = 4 * Ai, k 8 (1 - Ai, k)" should read -- Ai, k+1 = 4 * Ai, k * (1 - Ai, k) --.
**line 61 "Bi, k+1 = 4 * Bi, k 8 (1 - Bi, k)" should read --Bi, k+1 = 4 * Bi, k ***

<u>Column 13</u>,
Line 14, after "value" delete ",".

<u>Column 17</u>,
Line 28, after "are influenced" insert -- by --.
Line 46, "perform" should read -- performs --.

UNITED STATES PATENT AND TRADEMARK OFFICE
CERTIFICATE OF CORRECTION

PATENT NO. : 6,757,448 B2
APPLICATION NO. : 09/933611
DATED : June 29, 2004
INVENTOR(S) : Nobuo Sasaki It is certified that error appears in the above-identified patent and that said Letters Patent is hereby corrected as shown below:

<u>Column 17,</u>
Line 56, after "embodiment" insert -- is --.

This certificate supersedes Certificate of Correction issued October 12, 2004.

Signed and Sealed this

Eighth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,757,448 B2
APPLICATION NO. : 09/933611
DATED : June 29, 2004
INVENTOR(S) : Nobuo Sasaki It is certified that error appears in the above-identified patent and that said Letters Patent is hereby corrected as shown below:

Title page,
Item [57], ABSTRACT,
Line 7, after "10" insert -- which --.
Line 16, after "influenced" insert -- by --.

Column 1,
Line 47, "are" should read -- is --.

Column 4,
Line 33, after "least" insert -- one --.
Line 55, after "image" delete "that".

Column 7,
Line 40, after "each" insert -- of the --.

Column 11,
Line 42, "fist" should read -- first --.

Column 12,
Line 60, "Ai, k+1 = 4 * Ai, k 8 (1 - Ai, k)" should read -- Ai, k+1 = 4 * Ai, k * (1 - Ai, k) --.
**line 61 "Bi, k+1 = 4 * Bi, k 8 (1 - Bi, k)" should read --Bi, k+1 = 4 * Bi, k * (1 - Bi, k)--.**

Column 13,
Line 14, after "value" delete ",".

Column 17,
Line 28, after "are influenced" insert -- by --.
Line 46, "perform" should read -- performs --.

UNITED STATES PATENT AND TRADEMARK OFFICE
CERTIFICATE OF CORRECTION

PATENT NO. : 6,757,448 B2  
APPLICATION NO. : 09/933611  
DATED : June 29, 2004  
INVENTOR(S) : Nobuo Sasaki It is certified that error appears in the above-identified patent and that said Letters Patent is hereby corrected as shown below:

<u>Column 17,</u>  
Line 56, after "embodiment" insert -- is --.

This certificate supersedes Certificate of Correction issued October 12, 2004 and August 8, 2006.

Signed and Sealed this

Fourteenth Day of November, 2006

JON W. DUDAS  
*Director of the United States Patent and Trademark Office*